United States Patent [19]  [11] 4,201,732
Wolinski et al.  [45] May 6, 1980

[54] CHEMICAL MILLING OF NEOPRENE RUBBER

[75] Inventors: Leon E. Wolinski, Cheektowaga; Richard G. Riebling, Hamburg; John H. Edholm, Tonawanda, all of N.Y.

[73] Assignee: Pratt & Lambert, Inc., Buffalo, N.Y.

[21] Appl. No.: 836,530

[22] Filed: Sep. 26, 1977

Related U.S. Application Data

[62] Division of Ser. No. 703,796, Jul. 9, 1976, Pat. No. 4,074,033.

[51] Int. Cl.² ............................................... C08F 8/06
[52] U.S. Cl. ........................... 525/363; 260/31.2 MR; 260/32.8 A; 260/33.2 R; 260/33.8 R; 260/96 D; 526/914; 525/387
[58] Field of Search ................. 526/57; 528/914, 47.3; 260/96 D, 845, 890, 31.2 MR, 32.8 A, 33.2 R, 33.8 R

[56] References Cited

U.S. PATENT DOCUMENTS

| | | | |
|---|---|---|---|
| 3,232,918 | 2/1966 | Rayner | 526/914 |
| 3,256,227 | 6/1966 | Kraus | 260/23.7 M |
| 3,957,737 | 5/1976 | Pautrat et al. | 528/32 |
| 4,074,033 | 2/1978 | Wolinski | 526/57 |
| 4,156,671 | 5/1979 | Keown et al. | 526/57 |

*Primary Examiner*—William F. Hamrock
*Attorney, Agent, or Firm*—Christel, Bean & Linihan

[57] ABSTRACT

A process for improving the processability of high molecular weight neoprene polymers which comprises treating a solution of said polymers in an organic solvent with an organic peroxide at room temperature in the presence of oxygen to reduce the molecular weight of said neoprene and lower the viscosity of said solution.

3 Claims, No Drawings

CHEMICAL MILLING OF NEOPRENE RUBBER

This is a division of application Ser. No. 703,796 filed July 9, 1976, now U.S. Pat. No. 4,074,033, issued Feb. 14, 1978.

SUMMARY OF INVENTION

The present invention relates to a process for the chemical milling of neoprene rubber to reduce the molecular weight thereof, particularly to a process for the chemical milling of neoprene rubber with organic peroxides.

Neoprene rubber is prepared by the free radical polymerization of 2-chloro-1,3-butadiene which is commonly known as chloroprene. The reaction is usually conducted with peroxide catalysts, persulfate salts being commonly employed. The reaction proceeds entirely by trans-1,4 addition to the monomer. Many of the raw polymers produced from conjugated dienes are tacky and find use in adhesives and cements. Neoprene rubber as currently produced has a molecular weight which is high enough to result in poor rheology in solvent based adhesives. This in turn leads to unacceptable performance when such an adhesive is applied by spraying, brushing or roller coating.

The problem of the applicability of high molecular weight neoprene has been solved in the past by a mechanical milling process in which the rubber is subjected to the action of two roll mills to reduce the molecular weight by the heat and shear of the mill.

The resultant mechanically milled neoprene performs much better in solvent based adhesives than unmilled neoprene. However, the mechanical milling procedure suffers from the disadvantage of high cost. The investment in rubber mills, specialized machinery and labor make the process prohibitively expensive. A need exists therefore for an alternative less expensive process for reducing the molecular weight of neoprene.

According to the process of the present invention, neoprene is made usable by a chemical milling process. The chemical milling is accomplished by subjecting the high molecular weight neoprene dissolved in a solvent to the action of free radicals produced by the decomposition of peroxides. The product obtained has improved rheology by virtue of the reduced molecular weight of the neoprene therein, and is thus eminently more suitable for use in solvent based adhesives.

Chemical degradation of polymers is well known in the prior art. Patent 3,313,793 discloses the degradation of high molecular weight polymers of conjugated dienes in solvent solution by the action of peroxides in the presence of a copper source and in the absence of oxygen. The copper acts to accelerate the degradation. Suitable polymers include polyisoprene and polybutadiene. The presence of oxygen produces undesirable side reaction and its exclusion requires specialized equipment such as closed vessels and the added inconvenience of operating in an inert atmosphere. Neoprene rubber is not contemplated according to this reference, nor would the method of the reference be applicable to neoprene since polychloroprene will dehydrochlorinate in the presence of copper. The resultant degraded polymer is dark in color and leads to weak, friable non-adhesive films.

U.S. Pat. No. 3,917,576 discloses the degradation of neoprene with organic-metallic disproportionation catalysts.

U.S. Pat. No. 3,144,436 teaches the use of peroxides to degrade stereoregular polymers in the oxygen-free melt zone of an extruder. Elevated temperatures and no solvent are employed. Similarly, U.S. Pat. Nos. 3,143,536, 3,444,155, 3,887,534 and 3,898,209 discloses the degradation of polymers at highly elevated temperatures.

Polymers have also been degraded with high energy radiation, as in U.S. Pat. Nos. 3,080,306 or with boron compounds (3,520,865) or mercaptans (3,525,722).

In short, there is a marked paucity of prior art which is applicable specifically to neoprene and a surfeit of prior art teaching polymer degradation under extreme conditions of temperature or with specialized chemical treatment.

According to the process of the present invention, neoprene may be degraded in solution in a relatively facile fashion in the presence of oxygen at room temperature employing readily available inexpensive organic peroxides. The resultant solution exhibits reduced viscosity as a result of the reduction in the molecular weight of the neoprene.

In a preferred embodiment of the invention a formulated neoprene adhesive, containing a pre-reacted phenolic resin, zinc oxide and magnesium oxide fillers in addition to neoprene, in an organic solvent is treated with an organic peroxide in the presence of air.

The reaction may be conducted at room temperature with or without agitation. Lower and higher temperatures may be employed if desired.

Suitable peroxides for the process of the present invention include benzoyl peroxide, tert-butyl peroxide, acetyl peroxide, methyl ethyl ketone peroxide, lauroyl peroxide, tertbutyl perbenzoate and the like.

The amount of peroxide employed is a function of the initial viscosity of the polymer solution and is dependent on the final viscosity desired.

The relationship between the amount of benzoyl peroxide added to standard contact cement formulae and the final viscosity of the cement may be expressed as:

$$\ln Y = -0.350 X + \ln C$$

where
Y = final viscosity;
X = phr benzoyl peroxide;
C = initial viscosity.

Accelerators may be optionally employed. Suitable accelerators include N,N-dimethyl-P-toluidine, N,N-dimethylaniline, N,N-diethlaniline, tertiary amines such as triethylamine, cobalt naphthenate, manganese naphthenate, transition metal salts and the like.

Suitable solvents are those in which both the undegraded and degraded polymers are soluble. Such solvents include acetone, methyl ethyl ketone, ethyl acetate, toluene, hexane, petroleum ether or the like and mixtures thereof.

While the chemical milling is preferably conducted on a formulated neoprene adhesive, the neoprene may also be degraded in solution before being formulated into an adhesive.

Adhesives which have been chemically milled show a resultant loss in tack proportional to the amount of peroxide added, relative to their unmilled counterparts. This could be a result of the peroxide's attacking the double bond of the neoprene molecule and forming an unstable aldehyde. In the presence of oxygen, the aldehyde will be oxidized to the corresponding acid which will react with the metal oxides present in the formulation. Some loss in tendering also is associated with the addition of the benzoyl peroxide and is possibly caused by the partial removal of some chlorine from the neoprene. The loss in tack and tendering can be recovered by reformulation of the base adhesive.

Solution stability (viscosity as well as functionality) has been demonstrated for 18 months. No changes in bond strength from fresh solutions (less than 3 months old) were observed. There are some indications, however, that aged solutions (older than 6 months) show enhanced bond strengths. Natural colored adhesives turn slightly darker brown with age.

The process of the present invention is not limited to neoprene and will work well with other polymers or copolymers such as styrene butadiene rubber or butadiene acrylonitrile rubber.

For a clearer understanding of the invention, specific examples are set forth below. These examples are merely illustrative and are not to be understood as limiting the scope and underlying principles of the invention in any way. All percentages are by weight unless otherwise indicated.

EXAMPLE 1

An 18% solution of non-milled neoprene rubber was prepared in 340 gms. of a mixed solvent composed of 10% ethyl acetate, 42% toluene, 31% Exxon 602 Aliphatic Solvent, and 17% lactol spirits (an aliphatic naphtha). The resulting composition sprayed very poorly and was unacceptable for either brush or roller coating.

EXAMPLE 2

The adhesive solution of Example 1 was prepared with the further addition of 0.006 gm benzoyl peroxide. The solution was refluxed for one hour at 80° C. and cooled to room temperature. The resulting solution sprayed more easily and could be brushed or roller coated acceptably.

EXAMPLE 3

The solution of Example 2 was prepared with the further addition of 0.002 gm cobalt naphthenate. The solution was stirred overnight at room temperature. The resulting solution sprayed, brushed and roller coated acceptably.

EXAMPLE 4

A standard neoprene contact cement with the following formula was prepared:

| Non-Volatile | Parts by weight |
| --- | --- |
| Neoprene | 100 |
| Pre-reacted phenolic resin | 45 |
| MgO | 8 |
| ZnO | 5 |
| Antioxidant | 2 |

| Volatile | Parts by weight |
| --- | --- |
| Acetone | 20 |
| Methyl ethyl ketone | 10 |
| Toluene | 20 |
| Lactol spirits | 7 |

| Volatile | Parts by weight |
| --- | --- |
| Hexane | 43 |

An adhesive prepared with the above formula at 21% N.V. with physically milled neoprene exhibited a viscosity of approximately 265 cps. This viscosity value makes the adhesive suitable for facile spray application with cobwebbing and wrap-around held to a minimum. Break-up is rated fine.

EXAMPLE 5

The formulation of Example 4 was prepared with nonmilled neoprene. The adhesive had a viscosity of approximately 485 cps, and passed a slower delivery rate, heavier cobwebbing, increased wrap-around and a coarser break-up in relation to the formulation of Example 4. The material was thus unacceptable for use as a spray grade adhesive.

EXAMPLE 6

Example 5 was repeated with the addition of 2.0 phr benzoyl peroxide. The peroxide was dispersed in the cement at room temperature by one hour of slow roller tumbling or ½ hour of higher shear agitation. The final viscosity of the mixture, which required from 2–8 hours to be realized was 255 cps, a suitable value for spray grade adhesives.

EXAMPLE 7

Four samples of the formulation of Example 4 containing unmilled neoprene were each treated with 0.75 phr benzoyl peroxide and were mixed for 10 minutes. The mixtures were subjected to different reaction conditions. The conditions and results are shown in Table I.

TABLE I

| Sample # | Temperature (°C.) | Duration of treatment (hrs.) | Air Bubbled | (CPS) Resultant Viscosity |
| --- | --- | --- | --- | --- |
| 1 | 6 | 16 | No | 261 |
| 2 | 22 | 16 | No | 269 |
| 3 | 50 | 16 | No | 259 |
| 4* | 22 | 2 | Yes | 255 |

*Sample 4 was agitated constantly while air was admitted. The batch was tared to make up the solvent loss. It is clear that neither the presence of air nor elevated or reduced temperatures have an effect on the degradation process.

EXAMPLE 8

A solution of 20% neoprene AD gum in toluene which had a viscosity value of 2100 cps was treated with 1 phr benzoyl peroxide at room temperature in the presence of oxygen. The viscosity of the resulting solution was reduced to 1240 cps.

While the particular compositions and process herein described are well adapted to carry out the objects of the present invention, it is to be understood that various modifications and changes may be made and this invention is of the scope set forth in the appended claims:

What is claimed:

1. A process for improving the processability of a high molecular weight neoprene polymer which comprises treating a solution of said polymer in an organic solvent with an organic peroxide at room temperature in the presence of oxygen to reduce the molecular weight of said neoprene and lower the viscosity of said solution, wherein said organic solvent solution of neoprene further contains the components of an organic adhesive composition, said components being selected from the group consisting of additional resins, fillers, antioxidants or mixtures thereof.

2. A process for improving the processability of a neoprene adhesive containing high molecular weight neoprene, a pre-reacted phenolic resin, zinc oxide, magnesium oxide and an organic solvent selected from the group consisting of acetone, methyl ethyl ketone, ethyl acetate, toluene, hexane, petroleum ether and mixtures thereof wherein said adhesive is treated with benzoyl peroxide at room temperature in the presence of oxygen to reduce the molecular weight of said neoprene and lower the viscosity of said solution.

3. A neoprene adhesive which may be sprayed, brushed or rolled, which is prepared by the process of claim 2.

* * * * *